United States Patent [19]

Wall

[11] Patent Number: 5,653,027
[45] Date of Patent: Aug. 5, 1997

[54] CABLE STRIPPER

[75] Inventor: Jonathan Richard Wall, Wolverhampton, Great Britain

[73] Assignee: Ross Courtney Limited, West Midlands, United Kingdom

[21] Appl. No.: 523,875

[22] Filed: Sep. 6, 1995

[30]     Foreign Application Priority Data

Sep. 28, 1994 [GB] United Kingdom ............... 9419498

[51] Int. Cl.⁶ .................................................. B26B 27/00
[52] U.S. Cl. ........................................ 30/90.8; 30/90.9
[58] Field of Search ............................... 30/90.6, 90.8, 30/90.9, 91.1, 91.2, 90.4; 81/9.4, 9.41

[56]                References Cited

U.S. PATENT DOCUMENTS

| 1,275,225 | 8/1918 | Cleve .................................. | 30/90.8 X |
| 4,489,490 | 12/1984 | Michaels et al. ..................... | 30/90.8 X |
| 5,265,338 | 11/1993 | Cheng .................................. | 30/91.2 X |

*Primary Examiner*—Douglas D. Watts
*Attorney, Agent, or Firm*—Learman & McCulloch

[57]            ABSTRACT

A cable stripping tool has a handle and a slidable cable clamp constantly urged by a spring constantly toward a cutter blade on the handle for cutting the sheath of a cable. The tool has a locking device which, when activated, locks the clamp against sliding movement in at least the direction away from the cutter blade so as to maintain efficient cutting performance of the blade when cutting the cable sheath.

9 Claims, 5 Drawing Sheets

CABLE STRIPPER

This invention relates to tools for stripping the insulation or like sheath from electrical cables of the kind comprising a handle carrying a cutting blade projecting from a shoulder at one end of the handle, and a cable clamp which extends transversely of that end and which is spring urged towards the handle. In use, the cable is located between the clamp and cutter and the spring urges the cable so that the blade penetrates the sheath until the shoulder abuts the sheath. The tool is then rotated about the axis of the cable to make a peripheral cut, then the tool is moved lengthwise of the cable to make a corresponding slit along the sheath, which enables the sheath to be peeled off the core or conductors of the cable.

BACKGROUND OF THE INVENTION

The problem with this well known tool is that in making the lengthwise cut, the force necessarily applied to the handle tends to overcome the spring allowing the cable clamp to move away from the handle as the handle tilts to a position inclined to the cable, instead of being perpendicular to the cable, and the cutting blade then loses part of its penetration and makes an imperfect slit, which may not enable the peeling operation to be satisfactorily performed. The object of the invention is to solve this problem.

SUMMARY OF THE INVENTION

According to the invention, a tool of this kind has releasable detent means for locking the clamp in position at least against movement in the direction opposite to the spring urged direction.

It would be within the scope of the invention to lock the clamp against movement in both directions, but it is presently preferred to allow a spring urged movement and merely prevent the opposite movement.

Conveniently the releasable detent includes a member which can be displaced between effective and ineffective positions, and in the ineffective position the clamp may be displaced against the spring to allow the cable to be inserted between cutter and clamp.

Preferably the means comprise a sprag tooth which is movable to engage or release a ratchet-toothed rack on the clamp. The ratchet allows movement in one direction with the sprag lifting and re-engaging. However by making the teeth like saw teeth the action would prevent movement in both directions.

THE DRAWINGS

Embodiments of the invention are now more particularly described with reference to the accompanying drawings wherein.

DETAILED DESCRIPTION

Figure 1:
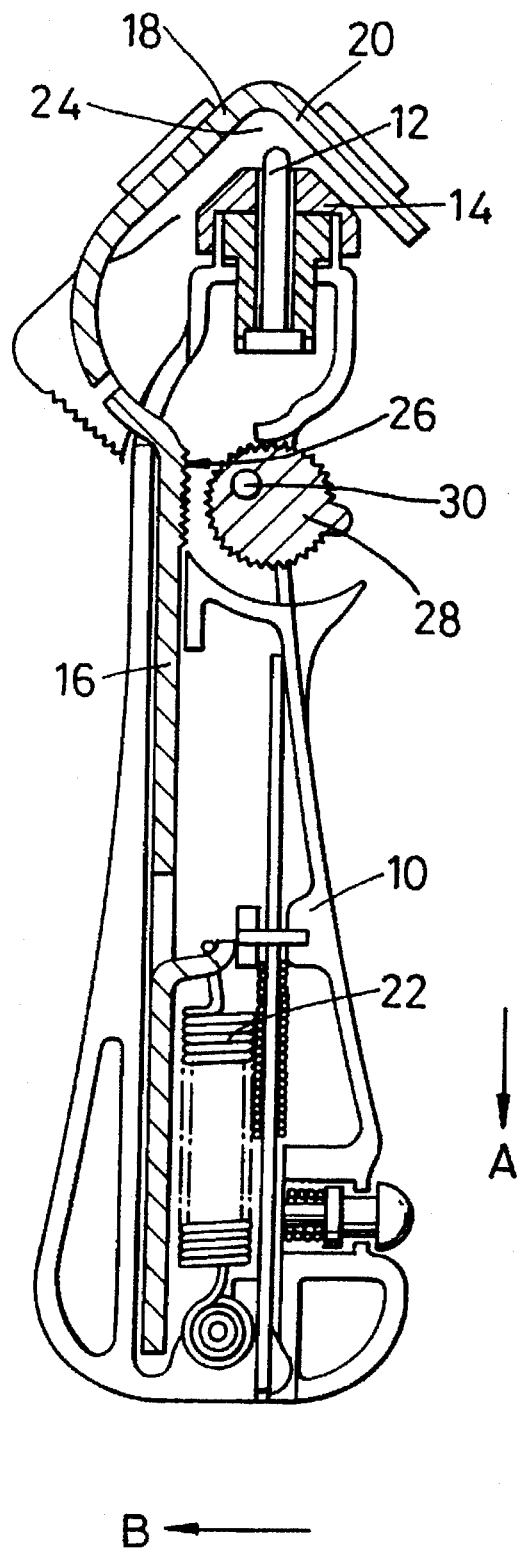
FIG. 1 is a sectional elevation of a tool according to the invention.

Turning now to the drawing and particularly FIG. 1, the tool comprises a handle 10 provided with cutter blade 12 projecting from a shouldered carrier 14 at a first end of the handle.

A cable clamp comprises a strip-like part 16 together with a transversely extending part 18 20 which overlies the cutter. The strip-like part is guided in a slot in the body 10 and urged in the direction of the arrow A by a tension spring 22. It will be appreciated that the cable clamp can be moved in the direction opposite to the arrow A against the spring, and when the force causing the movement is released, the spring will urge a cable located in the vicinity of the reference 24 so as to be penetrated by the cutter blade 12.

According to the invention, the strip 16 is provided with transversely extending ratchet teeth on the face 26 adjacent to a locking cam 28 pivoted on a pin 30 and provided with sprag teeth. The pivot is eccentric, and the arrangement is such that the cam can be pivoted from the illustrated position well clear of engagement to one in which the sprag teeth engage the rack so as to prevent movement of the clamp in the direction opposite to the arrow A whilst permitting the spring driven movement in the direction of the arrow A.

It will be appreciated that the geometry of the arrangement assists this operation. The spring tends to pull the strip in a direction which pivots the cam to a released position, whereas movement of the parts in a direction opposite to the arrow A pivots the cam to jam further movement.

Figure 2:
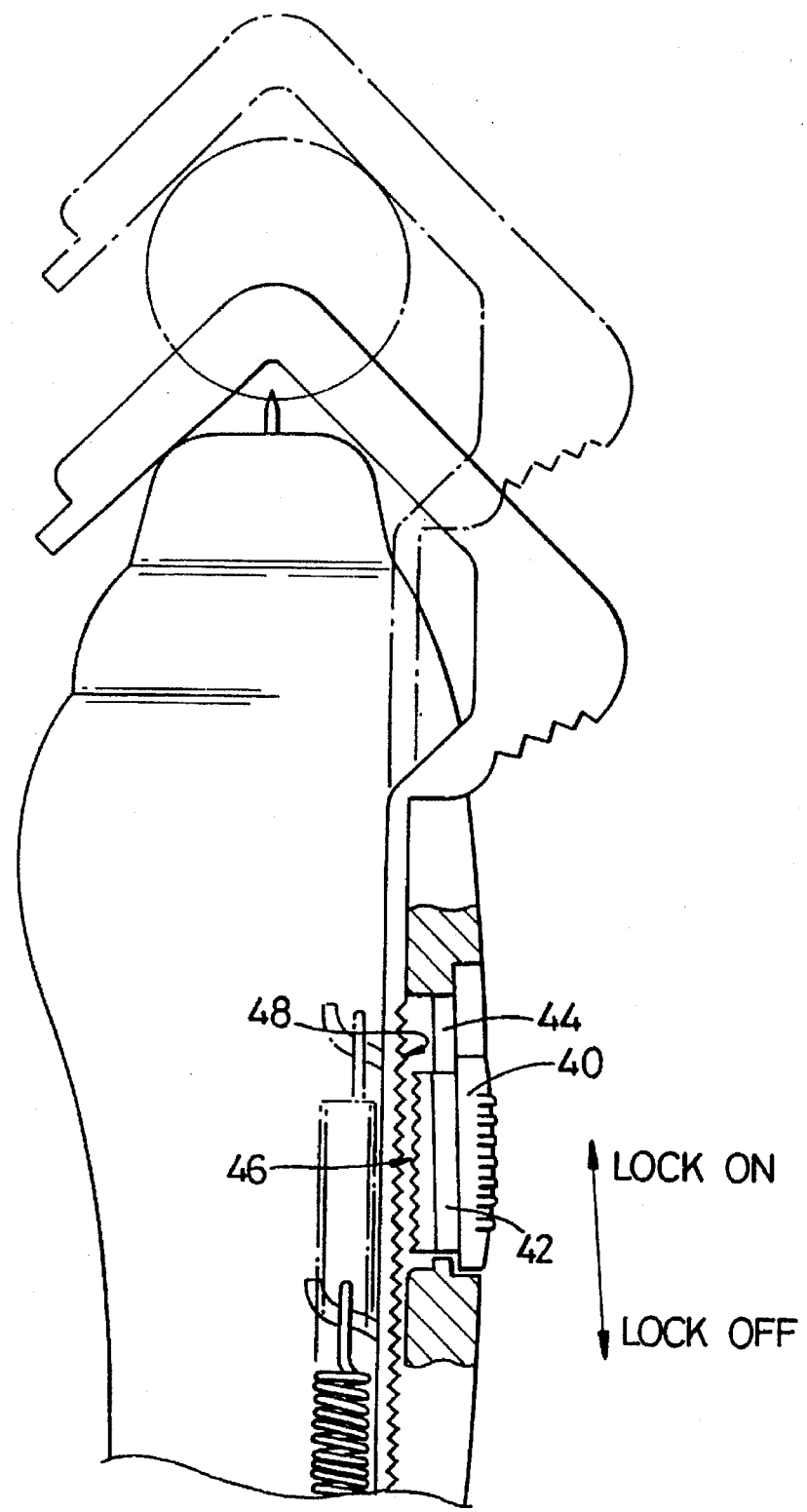
FIG. 2 is a fragmentary sectional view of a second embodiment of the invention.

Turning next to FIG. 2, this shows a modification of the arrangement of FIG. 1, where the cam 28 is replaced by a sliding lock 40 having longitudinal grooves 42 engaged by guide ribs 44 which are inclined so that as the part 14 is slid along the length of the ribs a set of locking teeth 46 is moved into engagement with the teeth 48 on the part 16. It will be noted that the inclination of the ribs 44 is directed again so that any force tending to move the cable clamp away from the cutter also tends to pull the slider into even further wedging engagement.

Figure 3:
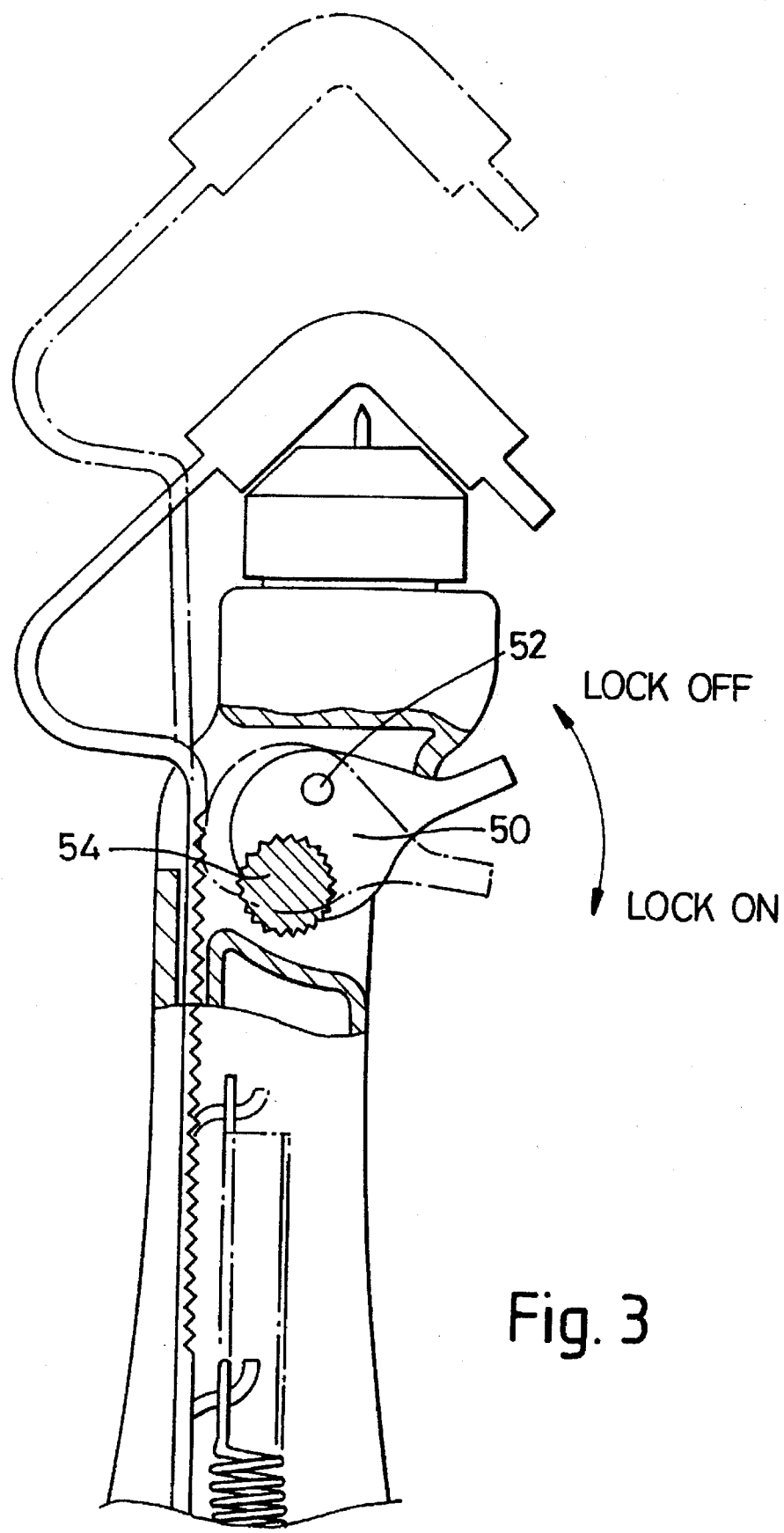
FIG. 3 is a fragmentary sectional view of a third embodiment of the invention.

In FIG. 3, locking is achieved by a cam 50 pivoted at 52 and carrying a fixed (that is to say not rotatable relative to the cam) serrated part 54. Locking movement involves clockwise travel of the cam, and again forces which are to be resisted by the lock tend to pull the lock more firmly to the position resisting the unwanted movement of the cable clamp.

Figure 4:
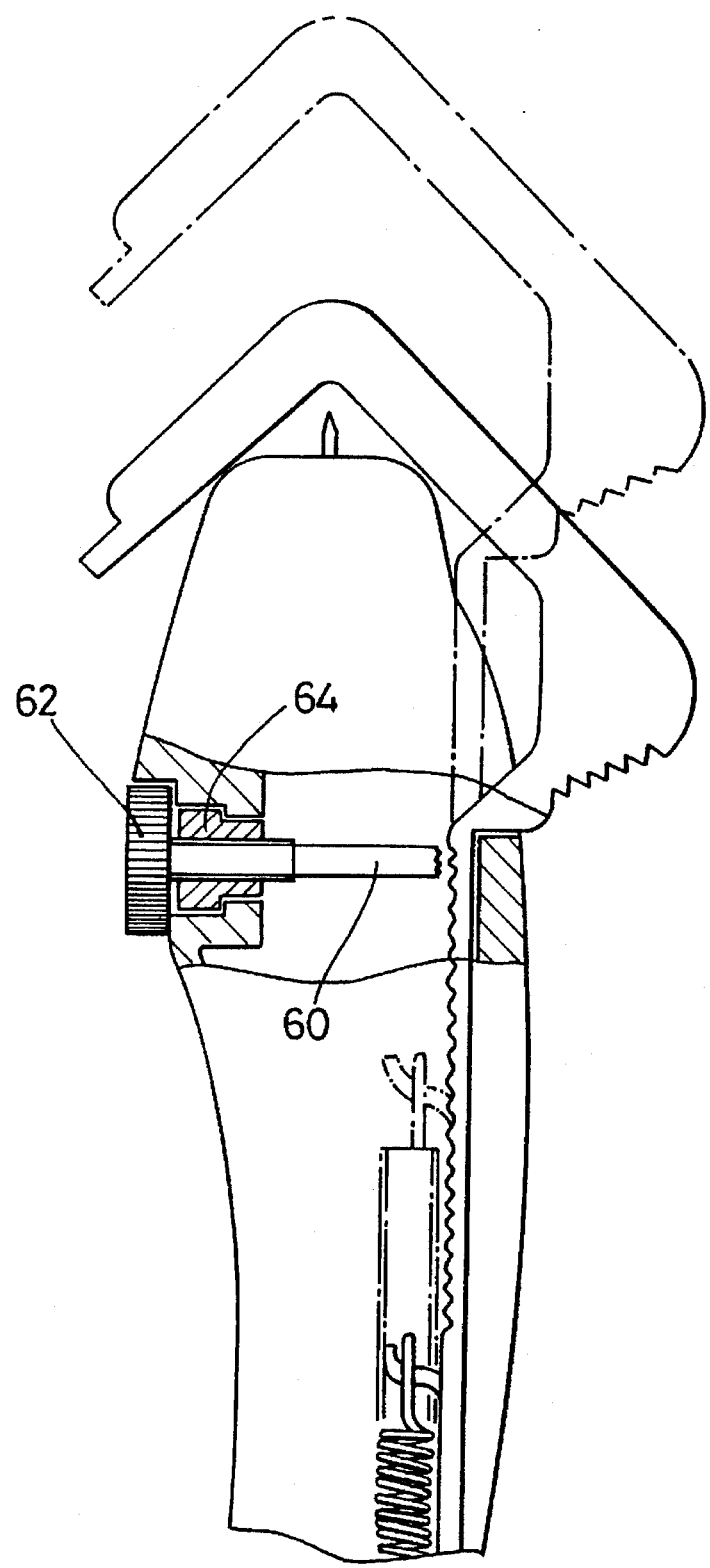
FIG. 4 is a fragmentary sectional view of a fourth embodiment.

In FIG. 4, the lock is provided by a spindle 60 which is angularly moved by a control knob 62, being threadably engaged with the body of the device: in the specific embodiment shown in the drawings the thread is provided in an inserted nut 64. With a suitable thread pitch, locking and release may be effected by turning the knob through part of a single revolution in one or other direction.

Figure 5:
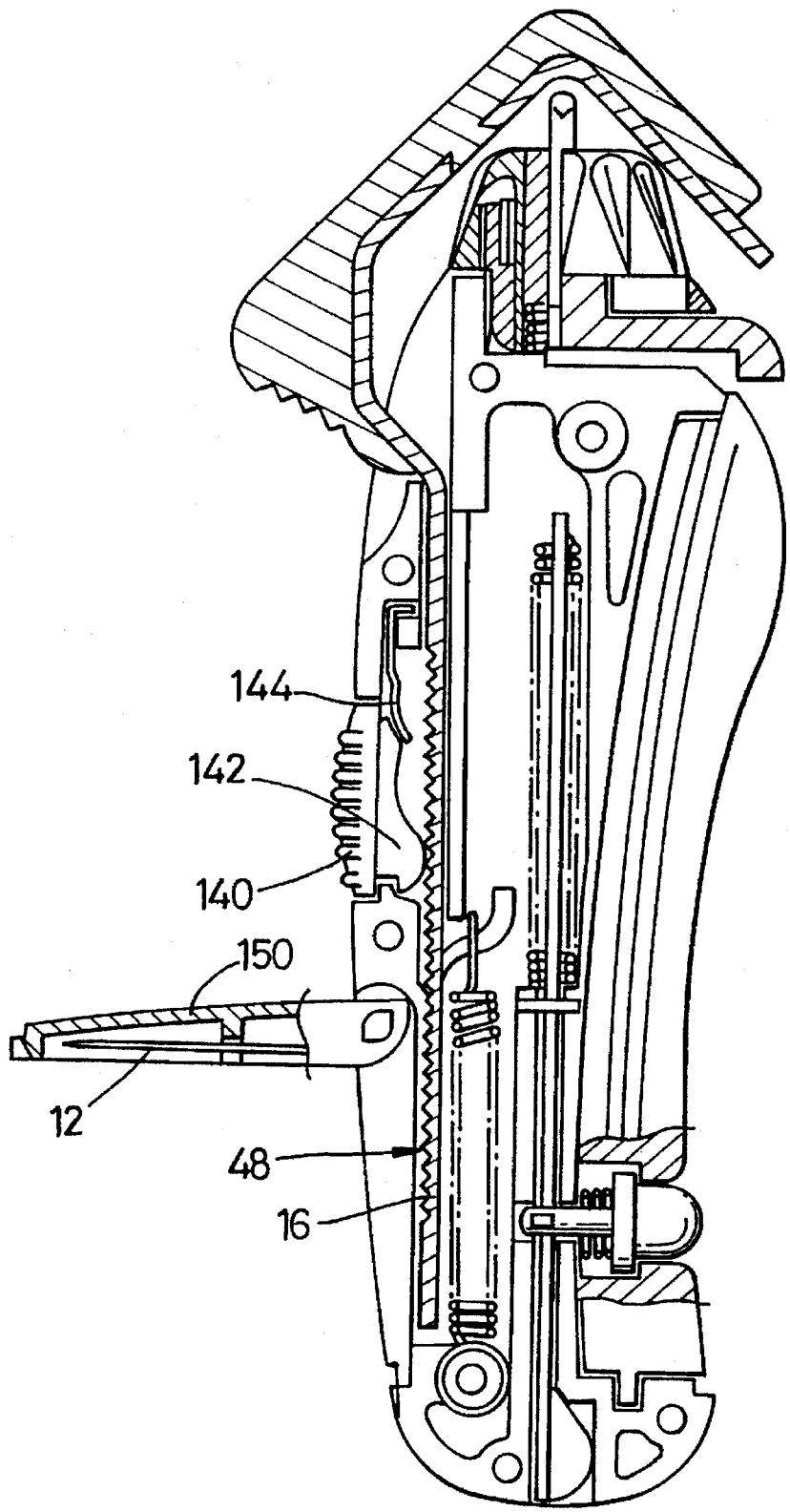
FIG. 5 is sectional view of a fifth embodiment of the invention.

In FIG. 5, the arrangement is generally similar to FIG. 2 except that now the sliding lock 140 moves parallel to the part 16, and has an integral cam 142 to displace a metal pawl 144 and engage a free end of the same in the teeth 48. The part 144 is a blade spring trapped in the body of the tool. The part 150 is a pivoted holder for a spare cutting blade 12.

I claim:

1. A cable stripping tool comprising:

an elongate handle having a longitudinal axis;

a cutter blade projecting axially from one end of said handle;

a clamp member having a transverse clamping seat opposite said cutter-blade, said clamp member being slidable axially of said handle to enable axial displacement of said clamping seat in directions toward and away from said cutter blade;

a spring acting on said clamp member and constantly urging said clamping seat in a direction toward said cutter blade; and releasable locking means acting on said clamp member and operable releasably to secure said clamping seat against said axial displacement in at least the direction away from said cutter blade.

2. The tool of claim 1 wherein said locking means comprises a locking member mounted on said handle adjacent said clamp member for movement into and out of locking engagement with said clamp member in response to movement of said clamping seat away from and toward said cutter blade, respectively, so as to permit said clamping seat to move freely toward said cutter blade while locking said clamping seat portion against movement away from said cutter blade.

3. The tool of claim 2 wherein said locking member comprises a cam having spaced locking teeth engagable with a rack of correspondingly spaced teeth of said clamp member, said cam being mounted eccentrically on said handle in such relation to said clamp member as to displace said locking teeth of said cam out of locking engagement with said teeth of said rack in response to said movement of said camping seat toward said cutter blade and into said locking engagement in response to movement of said clamping seat away from said cutter blade.

4. The tool of claim 2 wherein said locking member comprises a locking element having locking teeth engagable with the locking teeth of said clamp member, said locking element being slidable along said handle in inclined relation to the axial movement of said clamp member to wedge said locking teeth of said locking element into locked engagement with said locking teeth of said clamping member in response to said movement of said clamping seat away from said cutter blade and to displace said teeth of said locking element out of said locked engagement with said teeth of said clamping member in response to said movement of said clamping seat toward said cutter blade.

5. The tool of claim 1 wherein said clamp member includes an axially extending rack of locking teeth and said locking member comprises a spindle threadedly supported by said handle for movement of a free end of said spindle transversely into and out of locking engagement with said locking teeth of said clamp member.

6. The tool of claim 2 wherein said clamp member includes an axially extending rack of locking teeth and said locking member includes a cantilevered spring pawl portion mounted on said handle adjacent said rack and a slidable portion supported by said handle and engagable with said spring pawl to deflect said pawl into locked engagement with said teeth of said clamp member against the spring force of said pawl in response to sliding movement of said slidable portion in one direction and to permit said spring pawl to return out of locked engagement with said teeth of said clamp member in response to sliding movement said slidable member in the opposite direction.

7. A cable stripping tool comprising an elongate handle having a body axially dimensioned to be grasped in the hand of a user, said handle having a first end, a slot extending axially of said body, and an opening at said first end; a cutter blade mounted on said body at said first end; a cable clamp having a first portion located in said slot and a transverse portion overlying said cutter blade, said cable clamp being movable relative to said slot so as to vary the distance between said transverse portion and said cutter blade to accomodate cables of different thicknesses therebetween; spring means carried by said body and acting on said cable clamp to urge said transverse portion constantly toward said cutter blade; and lock means mounted on said handle adjacent said first end in a position manually manipulable to enable the user first to extend said transverse portion bodily away from said cuter blade in opposition to said spring to accommodate the insertion of a cable between said transverse portion and said cutter blade, and then to release said transverse portion to allow said spring to urge said transverse portion into contact with the inserted cable and press the cable against said cutter blade, and thereafter to manipulate said lock means and to fix the position of said cable clamp.

8. A tool as claimed in claim 7 wherein said cable clamp includes transversely extending teeth engagable by said lock means.

9. A tool as claimed in claim 8 wherein said teeth are ratchet teeth.

* * * * *